United States Patent [19]

Rodino et al.

[11] Patent Number: 5,074,630

[45] Date of Patent: Dec. 24, 1991

[54] INTEGRATED OPTICS DEVICE MOUNTING FOR THERMAL AND HIGH G-SHOCK ISOLATION

[76] Inventors: Vincent D. Rodino, 158 Long Hill Dr., Glastonbury, Conn. 06033; Ronald J. Schilling, 111 Gracey Rd., Canton, Conn. 06019

[21] Appl. No.: 594,539

[22] Filed: Oct. 9, 1990

[51] Int. Cl.⁵ .............................................. G02B 6/12
[52] U.S. Cl. ...................................... 385/14; 385/147
[58] Field of Search ............... 350/96.11, 96.12, 96.20

[56] References Cited

U.S. PATENT DOCUMENTS

| | | | |
|---|---|---|---|
| 4,750,800 | 6/1988 | Fournier et al. | 350/96.11 |
| 4,867,524 | 9/1989 | Courtney et al. | 350/96.20 |
| 4,871,226 | 10/1989 | Courtney et al. | 350/96.17 |
| 4,964,688 | 10/1990 | Caldwell et al. | 350/96.20 |

FOREIGN PATENT DOCUMENTS

| | | | |
|---|---|---|---|
| 60-80804 | 5/1985 | Japan | 350/96.11 |
| 63-306402 | 12/1988 | Japan | 350/96.11 |
| 2105487 | 3/1983 | United Kingdom | 350/96.11 |

*Primary Examiner*—John D. Lee
*Attorney, Agent, or Firm*—Richard H. Kosakowski

[57] ABSTRACT

An integrated optics (IO) chip comprising an optical signal path disposed in a principal plane of a crystalline chip having a known chip thickness, anisotropic thermal characteristics, and crystallographic orientation, is mounted to a first surface of a similar thermally anisotropic crystalline material substrate. A second surface of the substrate, spaced from the first surface at a substrate thickness approaching the known chip thickness, is bonded to a mounting surface with a visco-elastic polymer adhesive. Employing this adhesive allows a substantial reduction in the thickness of the substrate as compared to the thickness of the IO chip while allowing vibration and high G-shock loads to be imparted on the structure without affecting the electro-optical properties of the IO chip.

12 Claims, 1 Drawing Sheet

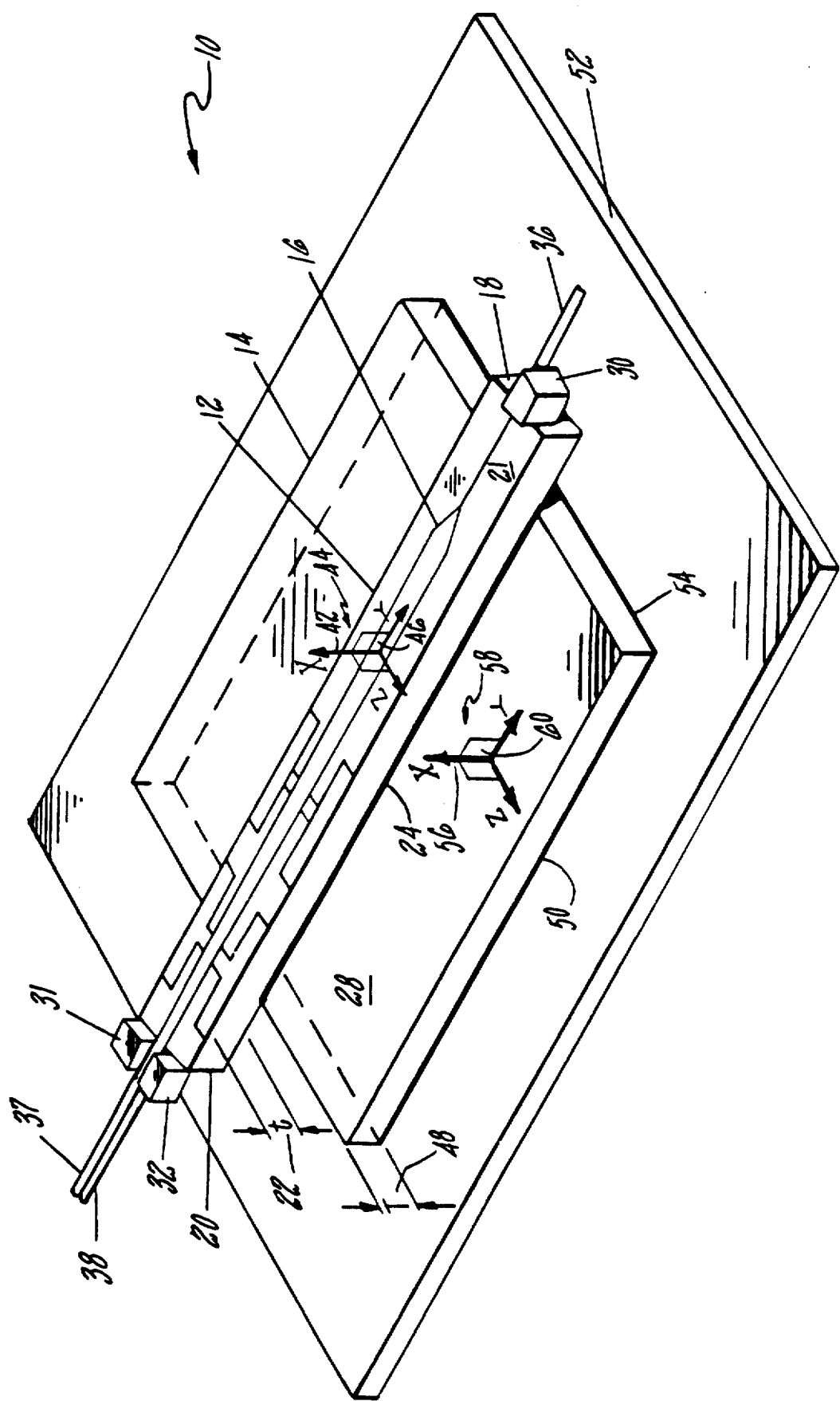

INTEGRATED OPTICS DEVICE MOUNTING FOR THERMAL AND HIGH G-SHOCK ISOLATION

TECHNICAL FIELD

This invention relates to mounting structures for integrated optics devices, more particularly to such structures allowing the optics device to operate in severe thermal and G-shock load environments.

BACKGROUND ART

U.S. Pat. No. 4,750,800 ('800) to Fournier et al., assigned to the assignee of the present invention, articulately presents an explanation of the background art involved in the mounting of integrated optics devices to substrate materials. Although a good approach, this attempt had several shortcomings.

'800 teaches an apparatus comprising a lithium niobate ($LiNbO_3$) integrated optics (IO) chip mounted to a $LiNbO_3$ substrate with an ultraviolet cured adhesive. The substrate is mounted to a support package structure with a compliant adhesive bonding. However the substrate must be at least ten times the thickness of the IO chip in order to reduce the thermally and G-shock induced stresses transmitted through the substrate from the support package.

This constraint presents a problem since $LiNbO_3$ with a 10 millimeter(mm) thickness is not available as a stock size and therefore is more expensive to procure. In addition, if the thickness of the substrate is reduced, less volume is required for the packaging along with less weight for the system in which the IO chip operates.

One application for integrated optics chips is in fiber optic rotation sensors (e.g., a fiber optic gyro) which may be used to provide guidance for precision guided weapons and tactical missiles. In particular, fiber optic rotation sensors may be employed in smart artillery shells such as the proposed Advanced "Copperhead". Since this type of shell is launched from an artillery piece (e.g., a 155 millimeter howitzer), high G-shock loads occur when the shell is being fired. This type of launching places a great deal of shock on components within the shell and thus innovative packaging techniques must be used if active electronics are to be placed within the shell.

The active electronics envisioned operating within these shells must sustain 20,000 G shock loads. This requirement creates a tremendous problem to designers involved with fiber optic rotation sensors since the performance of the $LiNbO_3$ IO chip is susceptible to stresses transmitted through the substrate. These stresses spuriously change the refractive index of the IO chip, thereby interfering with the modulation being performed in the IO chip as part of the well known signal processing in the rotation sensor. This interference results in an error in the detected rotation rate of the rotation sensor and hence reduced sensor performance and accuracy.

DISCLOSURE OF INVENTION

An object of the present invention is to provide a reduced stress mounting for an IO chip which can sustain high G-shock loads.

According to the present invention, an integrated optics chip comprising an optical signal path disposed in a principal plane of a crystalline chip having a known chip thickness, anisotropic thermal characteristics, and crystallographic orientation, is mounted to a first surface of a similar thermally anisotropic crystalline material substrate, with similar crystallographic orientation, to provide mutual orientation of the crystallographic axes of the chip and substrate, and a second surface of the substrate, spaced from the first surface at a substrate thickness approaching the known chip thickness, is bonded to a mounting surface with a visco-elastic polymer adhesive, whereby using the visco-elastic polymer adhesive allows a substantial reduction from that in the prior art in the thickness of the substrate as compared to the thickness of the IO chip, while still allowing the integrated optics chip to sustain high G-shock loads.

These and other objects, features and advantages of the present invention will become more apparent in light of the following detailed description of a best mode embodiment thereof as illustrated in the accompanying drawing.

BRIEF DESCRIPTION OF THE DRAWING

The sole FIGURE in this application is a perspective illustration of an IO chip low stress mounting structure in accordance with the present invention.

BEST MODE FOR CARRYING OUT THE INVENTION

The sole FIGURE which is not drawn to dimensional scale, illustrates an IO chip low stress mounting structure 10 comprising an IO chip 12 bonded to a substrate 14. For illustrative purposes the IO chip consists of a simple "Y" shaped optical waveguide 16, disposed in $LiNbO_3$ by means known in the art, e.g. ion exchange or titanium diffusion. The $LiNbO_3$ IO chip has angled chip endings 18, 20 of approximately ten degrees to reduce the reflections, and a crystal surface 21 spaced at a crystal thickness (t) 22 from a crystal mating surface 24 (i.e., IO chip bottom surface which is not shown); both surfaces lying in the principal plane of the IO chip. The mating surface 24 is bonded along its entire surface to a mounting surface 28 of the substrate 14.

The IO chip 12 is positioned on the mounting surface 28 and partially overhangs the substrate 14. Fiber carriers 30–32 are mounted to the angled chip endings 18, 20 to support input and output optical fibers 36–38. The optical fibers may be single mode fibers with a core diameter on the order of 4–12 microns and a cladding diameter of approximately 70–130 microns.

The $LiNbO_3$ IO chip thickness (t) 22 is approximately 1.0 millimeter, with length and width selected by the particular application. The IO chip is an X-cut crystal, i.e., by convention, an X axis 42 of a Cartesian coordinate system 44 for the IO chip is normal 46 to the crystal cut surface 21. Such a chip is available in standard stock thicknesses of 0.5 millimeter and 1 millimeter (e.g., Crystal Technology part number 99-00048-01). Also by convention, the longest dimension of the IO chip is identified by the Cartesian coordinate axis parallel to it. It is assumed that the longest dimension of the IO chip lies parallel to the waveguide path, and the IO chip is designated an "XY-cut".

The $LiNbO_3$ IO chip is adhesively bonded to the substrate mounting surface 28 using an ultraviolet cured adhesive. The mounting surface is spaced at a substrate thickness (T) 48 from a substrate mating surface 50 (i.e., substrate bottom surface which is not shown). The substrate mating surface 50 is attached to a support package structure 52 with a visco-elastic polymer adhesive 54 in accordance with the present invention so as to limit (by absorption) stress transmission from the support package structure 52 to the substrate 14. The visco-elastic polymer adhesive 54 (e.g., 3M SJ2015X Type 113 Adhesive) is a flexible high energy dissipative polymer which exhibits superior dynamic shear modulus and loss characteristics, and substantially increases the constrained layer damping.

The polymer adhesive 54 also has a visco-elastic characteristic, incorporating the characteristic of a rubber band that when stretched and released, it returns to its original length, and the characteristic of putty which absorbs energy and retains its extended shape when stretched. These characteristics are combined in the polymer adhesive such that the adhesive always returns to its original shape after being stressed, but does so slowly enough to oppose the next cycle of vibration.

Due to the visco-elastic nature of the polymer adhesive 54 which provides damping, the substrate thickness (T) 48 no longer has to be made large relative to the IO chip thickness (t) 22 in order to reduce thermally induced stress transmitted through the substrate from the package-to-substrate interface. This is in marked contrast to the aforementioned '800 patent to Fournier et al. The exact thicknesses depend on the particular IO chip environment and package material.

In the preferred embodiment as taught herein, the substrate thickness approximately equals the thickness of the IO chip. However, the substrate thickness may be as small as one-half the thickness of the IO chip. The flexibility and visco-elastic damping characteristics of the polymer adhesive 54 minimizes transmitted stresses to the substrate during shock, vibration and thermal environments. The support package material may be a metal, such as brass, or stainless steel, a suitable ceramic or a composite material with or without a reinforcing glass or carbon fiber filler.

The substrate material is chosen from materials having anisotropic thermal expansion characteristics similar to those of the IO chip 12. Preferably the substrate will exhibit anisotropic characteristics which would match exactly those of the IO chip, and in a best mode embodiment the substrate material would be identical to that of the IO chip (e.g., LiNbO₃ crystal with the same crystal cut as the IO chip). In the preferred embodiment of the present invention, the substrate is XY-cut LiNbO₃ as designated by an X axis 56 of a substrate Cartesian coordinate system 58 being normal 60 to the substrate mounting surface 28. The LiNbO₃ IO chip 12 is bonded to the LiNbO₃ substrate 14 with the crystallographic axes of each being mutually parallel (i.e., with mutual crystallographic orientation). With the IO chip and the substrate being so mounted, thermal expansion differences between the two are eliminated, thereby reducing stress in the IO chip.

While a LiNbO₃ material substrate represents the best mounting structure for reduced thermal stress of a LiNbO₃ IO chip, alternative, less costly, anisotropic material may be used. One such preferred alternative substrate material comprises composites of aluminum-graphite fiber formulated to have anisotropic thermal expansion characteristics which match LiNbO₃ crystal. By proper choice of fiber orientation and density, the LiNbO₃ can be matched exactly. These aluminum-graphite composites are commercially available, and have the advantage of lower cost, ease of machining, and unlimited size availability over the LiNbO₃ as the substrate. Another alternative material with anisotropic thermal characteristics similar to LiNbO₃ is Lithium Tantalate (LiTaO₃).

Although the present invention has been shown and described with respect to a best mode embodiment thereof, it should be understood by those skilled in the art that various other changes, omissions and additions to the form and detail thereof, may be made therein without departing from the spirit and scope of the invention.

We claim:

1. Apparatus for mounting an integrated optics device having an optical signal path fabricated in a crystalline chip of a certain thickness and crystallographic orientation selected to provide anisotropic thermal expansion in the principle plane of the optical signal path and having certain anisotropic coefficients of thermal expansion, comprising:

a substrate comprising crystalline material having a similar crystallographic axes orientation and similar anisotropic coefficients of thermal expansion to those of the crystalline chip, and having substrate first and second mounting surfaces spaced a substrate thickness apart, said substrate first mounting surface being adapted to receive the crystalline chip in bonded relationship thereto with mutual crystallographic orientation of the chip principal plane with said substrate first mounting surface; and package enclosure means having an enclosure mounting surface, characterized by:

said enclosure mounting surface being bonded to said substrate second mounting surface with a visco-elastic polymer adhesive.

2. The apparatus of claim 1, wherein said substrate thickness is at least one-half of said certain thickness of the crystalline chip.

3. The apparatus of claim 1, wherein the crystalline chip comprises a Lithium Niobate material.

4. The apparatus of claim 1, wherein said pressure sensitive acrylic film adhesive comprises a flexible high energy dissipative polymer with visco-elastic properties.

5. The apparatus of claim 1, wherein said substrate material is a LiNbO₃ cut crystal.

6. The apparatus of claim 1, wherein said substrate material is an anisotropic, aluminum-graphite composite material.

7. The method of mounting, to a surface, an integrated optics (IO) device of the type having an optical path disposed on a crystalline chip having anisotropic thermal characteristics, comprising the steps of:

determining the coefficients of thermal expansion of the chip and the orientation of the chip crystallographic axes in the principal plane of the optical signal path;

providing a crystalline material substrate having a similar crystallographic axes orientation and similar anisotropic coefficients of thermal expansion to those of the chip, and having substrate first and second mounting surfaces spaced apart at a substrate thickness;

fastening the chip to said substrate to provide mutual crystallographic orientation of the principal plane with said substrate first mounting surface; and bonding said substrate second mounting surface to the surface with a visco-elastic polymer adhesive.

8. The method of claim 7, wherein said step of determining further includes the step of measuring chip thickness; and said step of providing further includes selecting a substrate having said substrate thickness at least one half times said chip thickness.

9. The method of claim 7, wherein said integrated optics device is fabricated in Lithium Niobate crystal and said substrate material is a Lithium Niobate crystal.

10. The method of claim 7, wherein said substrate material is a graphite fiber-aluminum composite material with anisotropic thermal expansion coefficients substantially equal to those of Lithium Niobate.

11. The method of claim 7, wherein said substrate material is a graphite fiber-aluminum composite material with anisotropic thermal expansion coefficients substantially equal to those of Lithium Tantalate.

12. The method of claim 7, wherein said pressure sensitive acrylic film adhesive comprises a flexible high energy dissipative polymer with visco-elastic properties.

* * * * *